United States Patent [19]
Koss et al.

[11] Patent Number: 5,720,019
[45] Date of Patent: Feb. 17, 1998

[54] COMPUTER GRAPHICS SYSTEM HAVING HIGH PERFORMANCE PRIMITIVE CLIPPING PREPROCESSING

[75] Inventors: Louise A. Koss; Mary Louise Nash, both of Fort Collins, Colo.

[73] Assignee: Hewlett-Packard Company, Palo Alto, Calif.

[21] Appl. No.: 488,639

[22] Filed: Jun. 8, 1995

[51] Int. Cl.⁶ .................................................. G06F 15/72
[52] U.S. Cl. ............................................. 395/134; 395/503
[58] Field of Search ................................... 395/134, 133, 395/501, 502, 503, 505; 345/118

[56] References Cited

U.S. PATENT DOCUMENTS

| | | | |
|---|---|---|---|
| 4,888,712 | 12/1989 | Barkans et al. | 364/522 |
| 4,945,500 | 7/1990 | Deering | 364/522 |
| 5,003,497 | 3/1991 | Priem | 364/522 |
| 5,051,737 | 9/1991 | Akeley et al. | 340/747 |
| 5,079,719 | 1/1992 | Maillot et al. | 395/134 |
| 5,208,909 | 5/1993 | Corona et al. | 395/133 |

FOREIGN PATENT DOCUMENTS

| | | | |
|---|---|---|---|
| 2693012 | 12/1993 | France | 15/72 |
| 2226219 | 6/1990 | United Kingdom | 15/72 |

OTHER PUBLICATIONS

Computer Graphics: Principles and Practice Second Edition, Foley et al. (1990) pp. 125–126,868,872–873,878,891–893, 1990.

Primary Examiner—Phu K. Nguyen
Assistant Examiner—Sabrina Dickens

[57] ABSTRACT

A graphics processing circuit for use in a graphics accelerator that includes a clipping processor, with a vertex input data path operatively connected to a vertex data input of the clipping processor. A clipping preprocessor has a vertex data input operatively connected to the vertex input data path and a control output operatively connected to a control input of the clipping processor. The clipping preprocessor is constructed and arranged to perform an evaluation of a relationship between primitive vertex data from the vertex input data path and a clip region and to provide a signal on the control output based on this evaluation.

18 Claims, 11 Drawing Sheets

1

COMPUTER GRAPHICS SYSTEM HAVING HIGH PERFORMANCE PRIMITIVE CLIPPING PREPROCESSING

FIELD OF THE INVENTION

This invention relates to geometry accelerators in computer graphics systems and, more particularly, to geometry accelerators having improved clipping of graphics primitives.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, polylines, vectors and polygons, such as triangles or quadrilaterals. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

The basic components of a computer graphics system typically include a geometry engine, or geometry accelerator, a rasterizer and a frame buffer. The system may also include texture mapping hardware. The geometry accelerator receives from the host computer primitive data which define the primitives that make up the view to be displayed. The geometry accelerator uses the primitive data to perform transformations, decomposition of quadrilaterals into triangles, lighting, clipping and plane equation calculations, for each primitive. The output of the geometry accelerator is rendering data used by the rasterizer and the texture mapping hardware to generate data for each pixel in each primitive. The pixel data from the rasterizer and the pixel data from the texture mapping hardware are combined and stored in the frame buffer for display on the video display screen.

"Clipping" is an operation in which the geometry accelerator determines what portion of a primitive is to be displayed in what is known as a "clip region." The clip region can be a two-dimensional area such as a window, or it can be a three-dimensional view volume. The primitives being displayed in the clip region can be one-dimensional (e.g., lines) or two-dimensional (e.g., polygons).

Various techniques have been developed for clipping points, lines, and polygons. Some of these are: Cohen-Sutherland line clipping, parametric line clipping, Weiler polygon clipping, Liang-Barsky polygon clipping, and Sutherland-Hodgman polygon clipping. These techniques are computationally intensive graphics manipulations, especially when applied to clipping polygons against three dimensional clip regions.

To speed up operation of geometry accelerators, it is known to implement special-purpose circuitry that is dedicated to clipping operations. Nonetheless, the need exists for additional improvements in performance. In particular, the need exists for increasing the efficiency of data handling and computations by the geometry accelerator.

SUMMARY OF THE INVENTION

In one general aspect, the invention features a graphics processing circuit for use in a graphics accelerator that includes a clipping processor, with a vertex input data path operatively connected to a vertex data input of the clipping processor. A clipping preprocessor circuit has a vertex data input operatively connected to the vertex input data path and a control output operatively connected to a control input of the clipping processor. The clipping preprocessor is constructed and arranged to perform an evaluation of a relationship between primitive vertex data from the vertex input data path and a clip region and to provide a signal on the control output based on this evaluation.

The graphics accelerator can include vertex processing circuitry having an enable input and that generates display parameters of the primitive based on the primitive vertex data from its vertex data input, with the graphics processing circuit including a first circuit path between the vertex input data path and the vertex data input of the vertex processing circuitry, and a second circuit path between the control output and the enable input of the vertex processing circuitry. The clipping preprocessor can include x, y, and z coordinate preprocessing circuitry, which can each include memory cells in a shift register and combinatorial logic circuitry operatively connected to outputs of the memory cells. The clipping preprocessor circuit can include a vertex coordinate register and a window edge coordinate register operatively connected to the vertex input data path, and a comparator having a first input operatively connected to an output of the vertex coordinate register, a second input operatively connected to an output of the window edge coordinate register, as well as a matching circuit with inputs operatively connected to a comparison output of the comparator. The comparator can be a floating point comparator. The matching circuit can include shift registers each with a parallel input operatively connected to the comparison output. The matching circuit can have a trivial accept output and a trivial reject output. A clip code bus can be operatively connected between the clipping preprocessor and the clipping processor. The clipping preprocessor can include vertex processing circuits that each have an enable line. The clipping preprocessor can include at least three vertex processing circuits.

In another general aspect, the invention features a graphics processing method that includes generating display parameters from a definition of a first primitive having only coordinates that are outside of a clip region, concurrently determining whether the coordinates are all outside the clip region, and ceasing the generating step if the determining step determines that the coordinates are all outside the clip region.

The step of generating can be perforated by a first graphics processor portion and the method can include inhibiting the transfer of the display parameters to a second graphics processor portion if the step of determining determines that the coordinates are all outside the clip region. The method can also include generating display parameters from a definition of a second primitive that is different from the first primitive and that also has only coordinates outside of the clip region, and failing to determine that the coordinates of the second primitive are all outside the clip region. The method can further include generating display parameters from a definition of a second primitive that is different from the first primitive and that has only coordinates inside the clip region, and determining that the coordinates of the second primitive are all inside the clip region. The step of generating can be performed by a first graphics processor portion and the method can include transferring clip codes for the primitive to a second graphics processor portion. The method can include generating display parameters from a definition of a second primitive that has a different number of vertices than the first primitive.

In a further general aspect, the invention features a graphics processing method that includes defining a first half space below a minimum value of a first coordinate, defining a second half space above a maximum value of a first coordinate, defining a third half space below a minimum value of a second coordinate, defining a fourth half space above a maximum value of a second coordinate, defining a fifth half space below a minimum value of a third coordinate, defining a sixth half space above a maximum value of a third coordinate, determining whether vertices that make up a first primitive all fall within one of the half spaces, and generating a first trivial reject signal if the step of determining determines that the vertices that make up the first primitive all fall within one of the half spaces.

The step of determining can include a floating point comparison step. The method can include determining whether the vertices that make up the first primitive all fall outside of all of the half spaces, and generating a trivial accept signal if this step determines that the vertices that make up the first primitive all fall outside of all of the half spaces. The method can include further determining whether a different number of vertices that make up a second primitive all fall within any of the half spaces, and generating a second trivial reject signal if this step determines that the vertices that make up the second primitive all fall within any of the half spaces.

Geometry accelerators having improved clipping preprocessing according to the invention may be advantageous in that they can significantly reduce computational load for primitives that fall completely inside or completely outside of a clipping region. This can enable a graphics accelerator to display more primitives in a given amount of time. In addition, clipping preprocessing according to the invention can be performed using relatively little circuitry. This may allow for the implementation of less expensive geometry accelerators, and/or may leave room on an integrated circuit for other graphics processing features. Furthermore, where the clipping preprocessing generates clip codes, these need not be regenerated by a full-featured clipper, allowing for further performance improvements in the clipper.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
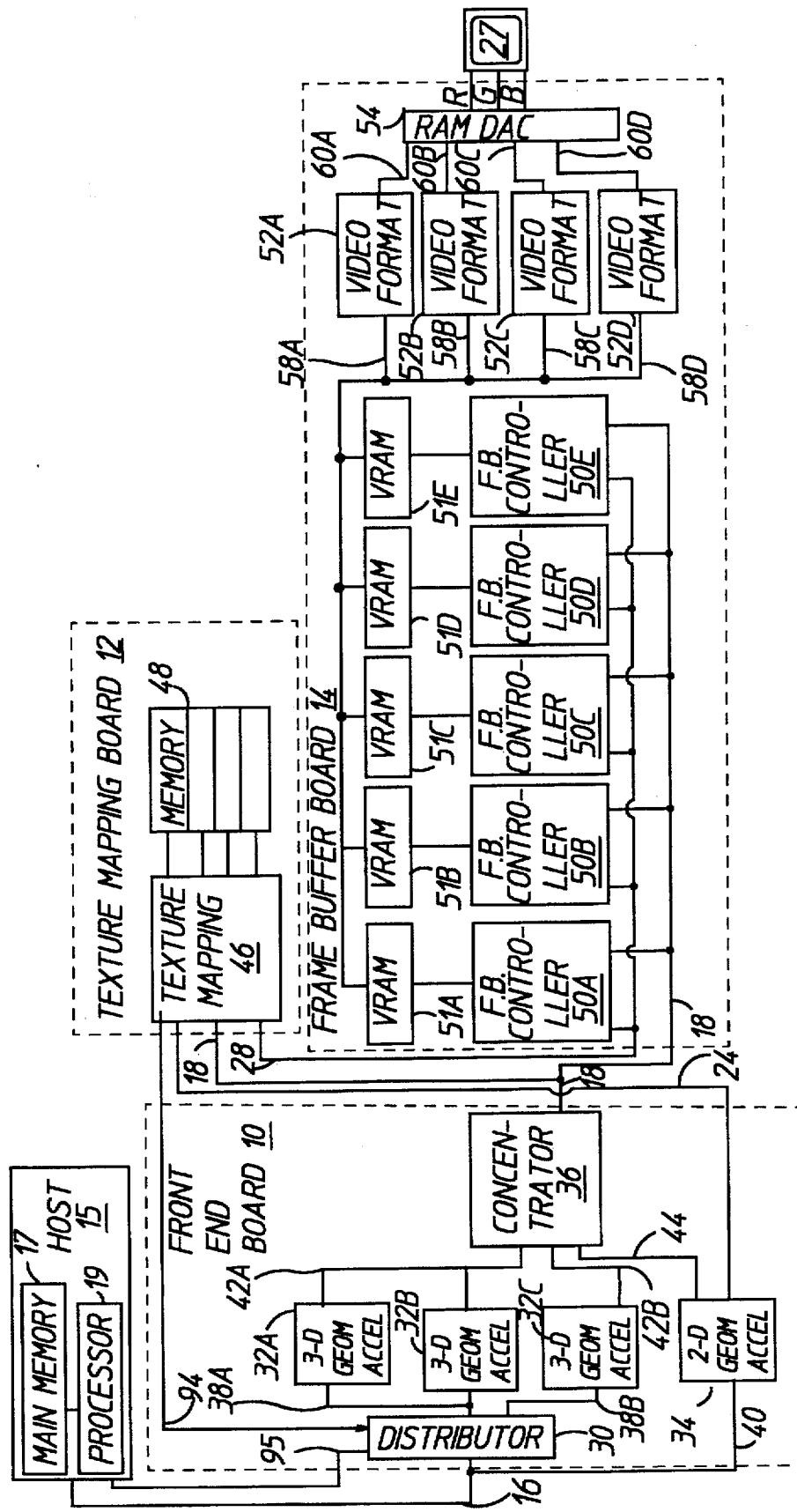
FIG. 1 is a block diagram of a first embodiment of a computer graphics system incorporating the present invention.

FIG. 1 is a block diagram of a first embodiment of a computer graphics system suitable for incorporation of clipping preprocessing in accordance with the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates, all for portions of the primitives, such as for the vertices when the primitive is a triangle. Data representing the primitives in three dimensions then are provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data are provided to the frame buffer board over five 55-bit buses 28, which are shown in FIG. 1 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen 27 to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the from end board, the front end board continues to operate upon and provide new primitives until the pipelines in the boards 12 and 14 become full.

The front end board 10 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data are provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data are provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows are displayed, or when a portion of a primitive extends beyond the view volume represented on the display screen. Output data from the 3-D geometry accelerator chips 32A and 32B, and 32C respectively are provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A-C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the local memory is formed from a plurality of SDRAM (synchronous dynamic random access memory). The cache memory 48 stores texture MIP map data associated with the primitives being rendered in the frame buffer board. The texture MIP map data are downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A-C include lines and triangles. The texture mapping board does not perform texture mapping of points or lines, and operates only upon triangle primitives. The data representing the triangle primitives include the x,y,z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

Texture data for each pixel are provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A–E are respectively coupled to groups of associated VRAM (video random access memory) chips 51A–E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data are provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that only the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data are serially shifted out of the VRAM chips and is respectively provided over 64-bit buses 58A, 58B, 58C, and 58D to the four video format chips 52A, 52B, 52C and 52D at a rate of 33 MHZ. The video format chips format the video data so that they can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 2:
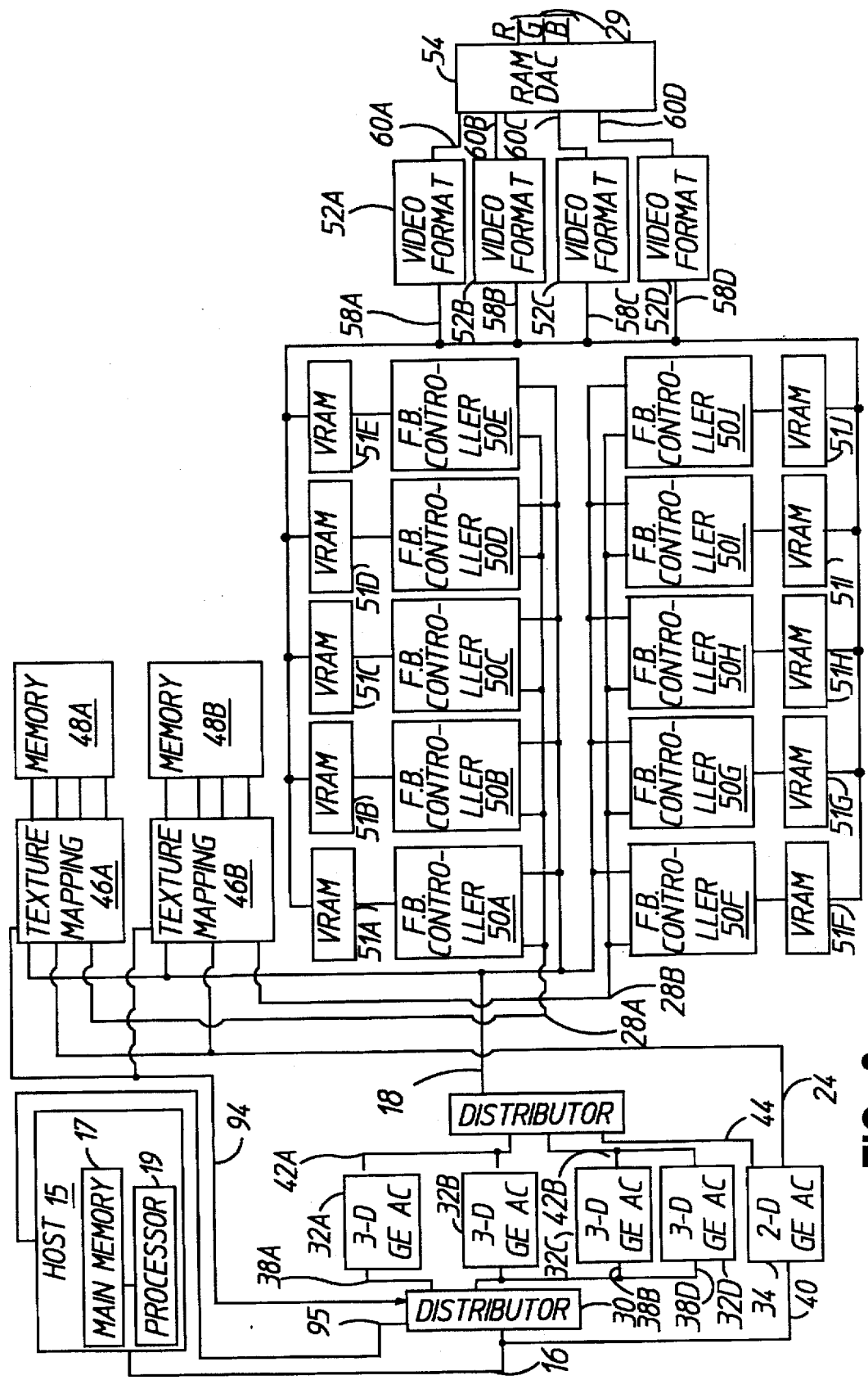
FIG. 2 is a block diagram of a second embodiment of a computer graphics system incorporating the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Figure 3:
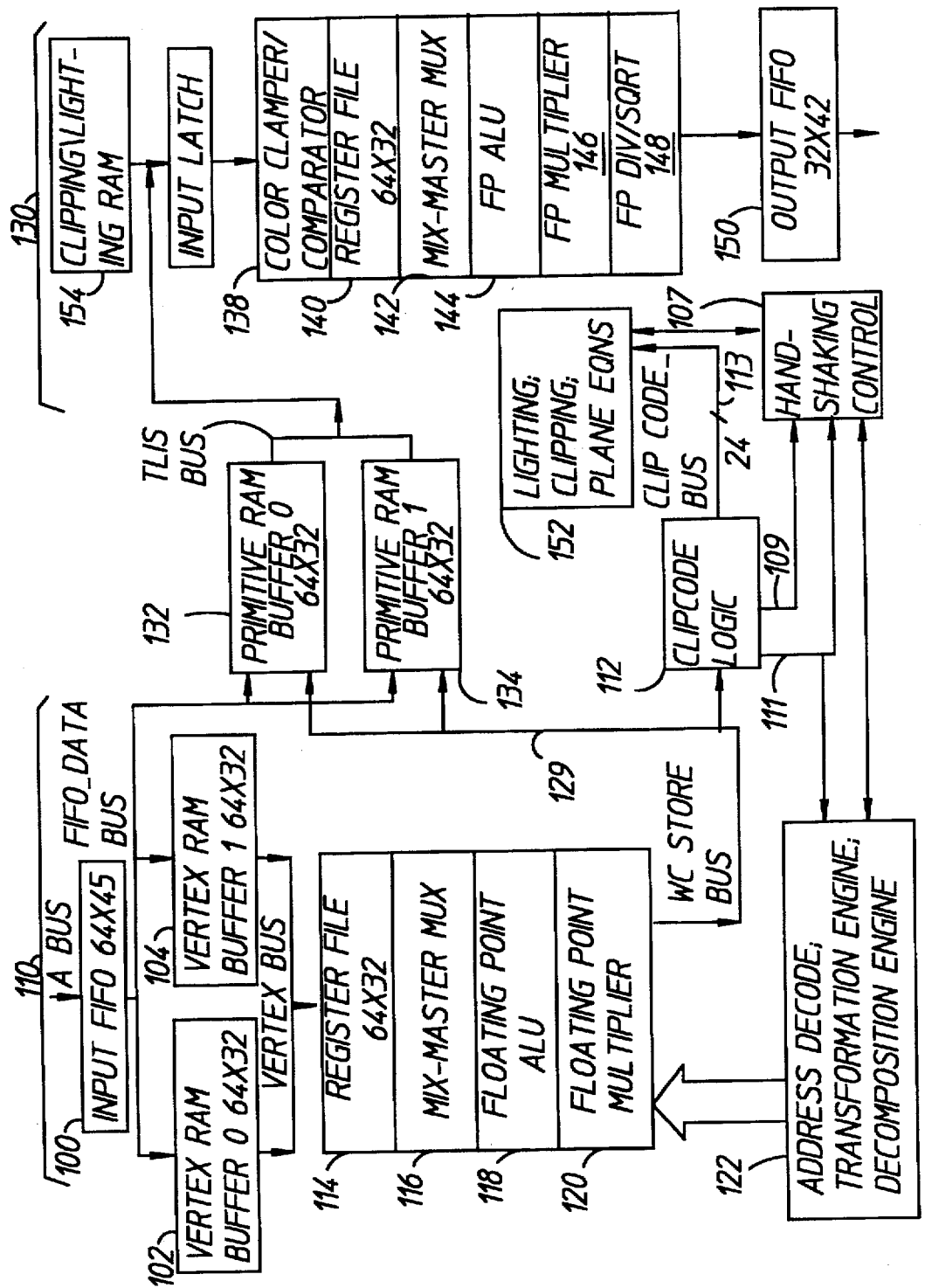
FIG. 3 is a block diagram of a geometry accelerator according to the present invention for use in connection with the graphics systems of FIGS. 1 and 2.

A simplified block diagram representative of the geometry accelerator chips 32A, 32B and 32C is shown in FIG. 3. Primitive data from the host computer 15 are supplied through an input FIFO 100 to a double-buffered vertex RAM which includes a first vertex RAM (buffer 0) 102 and a second vertex RAM (buffer 1) 104. The geometry accelerator includes two separate processors in a pipeline configuration. A left stack 110 includes clip code logic 112, a register file 114, a multiplexer 116, a floating point ALU 118 and a floating point multiplier 120. Operations of the left stack 110 are controlled by a left stack control unit 122. Results from the left stack 110 are supplied to a right stack 130 through a double-buffered primitive RAM, including a first primitive RAM (buffer 0) 132 and a second primitive RAM (buffer 1) 134. The right stack includes a color clamper/comparator 138, a register file 140, a multiplexer 142, a floating point ALU 144, a floating point multiplier 146, and a floating point divide/square root unit 148. Results from the right stack 130 are supplied through an output FIFO 150 to the texture mapping board 12 and the frame buffer board 14 (see FIG. 1). Operations of the right stack 130 are controlled by a right stack control unit 152, which includes lighting, clipping, and plane equation generation logic. The stack control units are designed hierarchically, with each one including a high level dispatcher and several lower-level controllers for the various functions of the stacks. A handshaking control unit 107 controls the interaction between the left and right stack control units. Clipping and lighting parameters are supplied by the host computer 15 to a clipping/lighting RAM 154.

The geometry accelerator performs transformations, decomposition of quadrilaterals and triangles, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 3, only the right stack 130 contains a divider, in order to limit size and cost. Because the right stack contains a divider and the left stack does not, the partitioning of functionality of the geometry accelerator is for the left stack to perform transformations, partial slope calculations, clip checking, decomposition and some precalculations for lighting. The right stack performs lighting, clipping and plane equation calculations. The basic flow of operations is for primitive data to be entered in the input FIFO 100 from the host computer. The primitive data are put into one of the vertex RAM buffers 102 and 104. The left stack 110 then performs transformations, decomposition, and partial slope calculations and places the results in one of the primitive RAM buffers 132 and 134 via a local bus 129. When the left stack has completed its operations for a primitive, its controller 122 notifies the controller 152 of the right stack 130 to begin operations on the primitive via the handshaking controller 107. The left stack can then start working on the next primitive. At the same time, the right stack performs lighting, clipping (if required), and plane equation calculations on the primitive that is in the primitive RAM buffer. In an alternative embodiment, both the left and right stacks contain identical hardware, including dividers. In this configuration, functionality may be partitioned such that each stack performs the same operations on different primitives.

Figure 4:
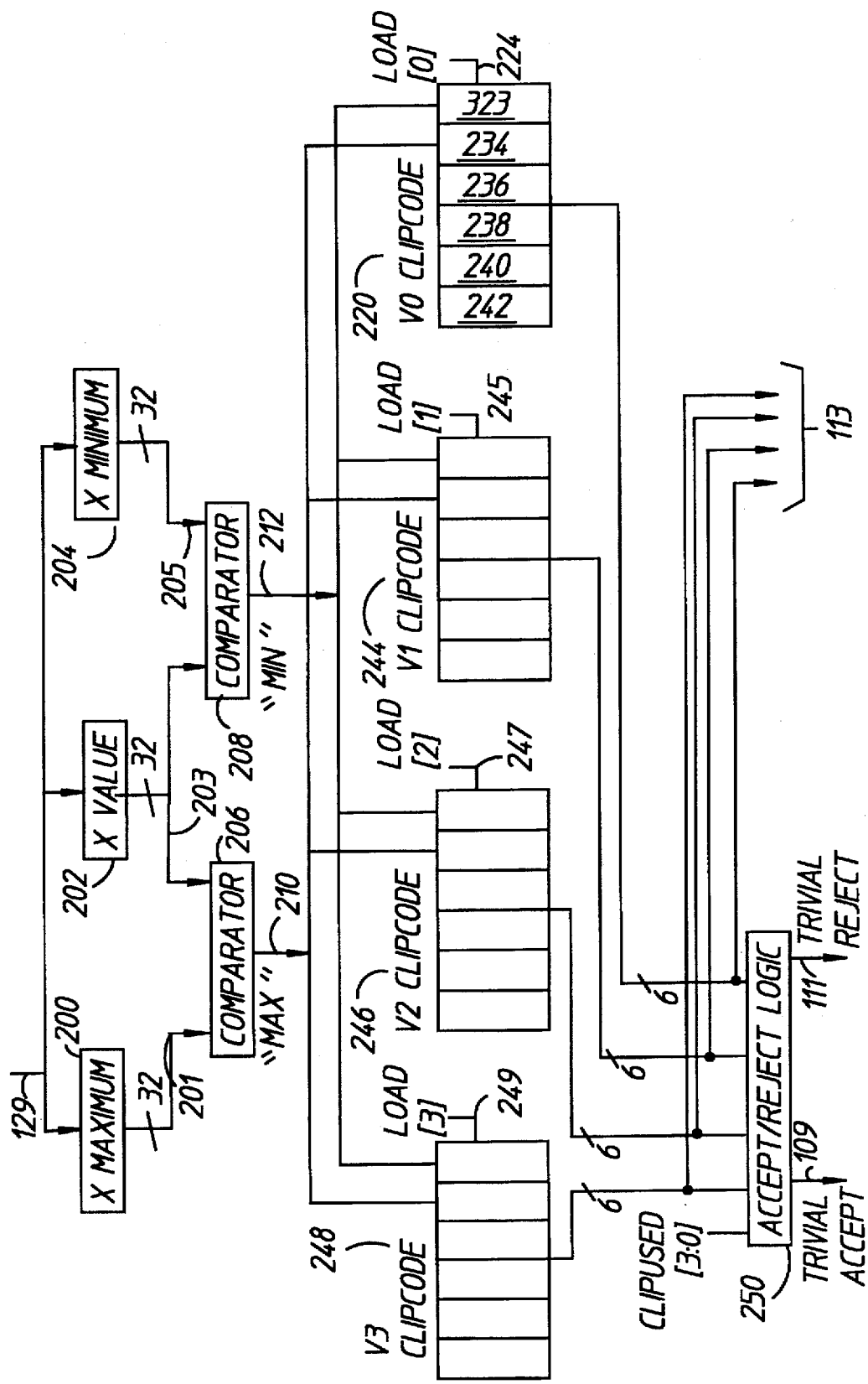
FIG. 4 is a block diagram of a clipping preprocessing circuit that forms a part of the geometry accelerator of FIG. 3.

Referring to FIGS. 3 and 4, the structure of the circuitry that performs clipping preprocessing in the geometry accelerators of the present embodiment will now be discussed in more detail. The clip code logic 112 is a sequential digital clipping preprocessing circuit. It has an input port operatively connected to an output port of the left stack 110 via an output bus 129, and an output port operatively connected to a clip code bus 113. A trivial accept output line 109 and a trivial reject output line 111 are supplied to inputs of the handshaking control unit 107, and the trivial reject output line is supplied to an input of the left stack control unit 122 as well.

The clipping preprocessing circuit includes a maximum clipping extent register 200, a clipping vertex coordinate register 202, and a minimum clipping extent register 204. These each have input ports operatively connected to the local bus 129 of the left stack 110. A first floating point comparator 206 has a first input port operatively connected to a second register output bus 203 from an output port of the vertex coordinate register, and a second input port operatively connected to a first register output bus 201 from an output port of the maximum clipping extent register. A second floating point comparator 208 has a first input port operatively connected to the second register output bus and a second input port operatively connected to a third register output bus 205 from an output port of the minimum clipping extent register.

Each of the floating point comparators 206, 208 compares the two floating point numbers it receives and provides a signal that indicates which one is larger. In particular, the first floating point comparator 206 provides a logic high signal (binary one) on a maximum output line 210 if the value it receives from the vertex coordinate register 202 is higher than the value it receives from the maximum register 200. Conversely, the second floating point comparator 208 provides a logic high signal on a minimum output line 212 if the value it receives from the vertex coordinate register is less than the value it receives from the minimum register 204.

The floating point comparators operate on two 32-bit IEEE-754 standard floating point format numbers. The most significant bit in this format is a sign bit, with a one indicating that the number is negative and a zero indicating that the number is positive. The eight next most significant bits are an exponent, and the last 23 bits are a fractional mantissa.

Figure 5:
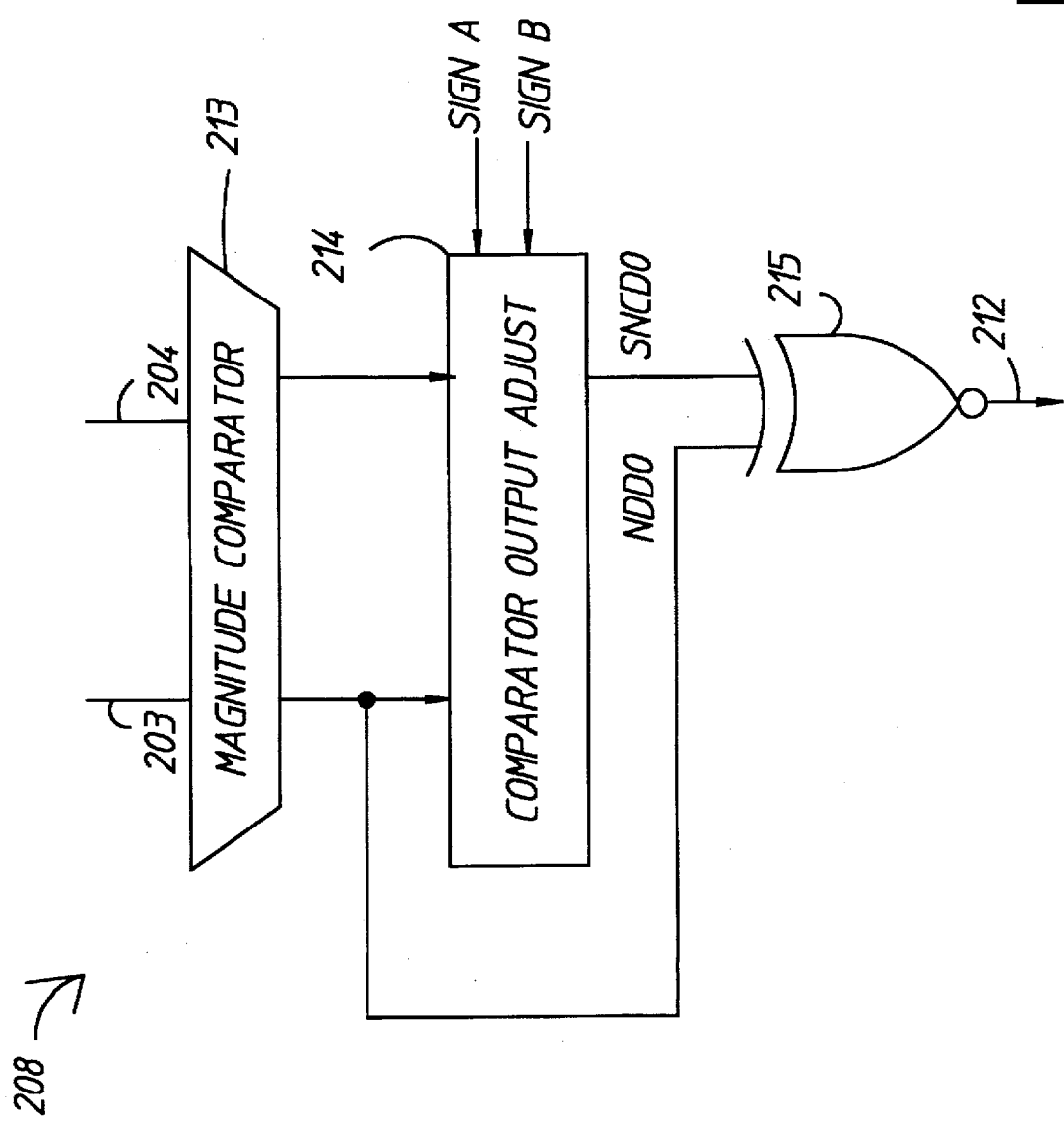
FIG. 5 is a block diagram of a floating point comparator for the clipping preprocessing circuit of FIG. 4.

In order to operate on signed values, the comparators are implemented as magnitude comparators with additional circuitry. In particular, referring also to FIG. 5, the second comparator 208 includes a magnitude comparator 213 that has a first input port operatively connected to the second output bus 203 which is from the output port of the vertex coordinate register 202. The magnitude comparator has a second input port operatively connected to the third output bus 205, which is from the output port of the minimum clipping extent register 204.

The magnitude comparator first modifies the numbers it receives on its two input ports by swapping their sign bits. It then performs a magnitude comparison, which produces signals on a first output NDD0 and a second output NCD0. A logic high output on the first output NDD0 indicates that the two numbers are equal, and a logic low indicates that they are not equal. A logic high output on the second output NCD0 in combination with a logic low output on the first output NDD0 indicates that the modified number from the first input port is larger than the modified number from the second input port. The two outputs NDD0 and NCD0 are provided to a comparator output adjustment circuit 214.

Figure 6:
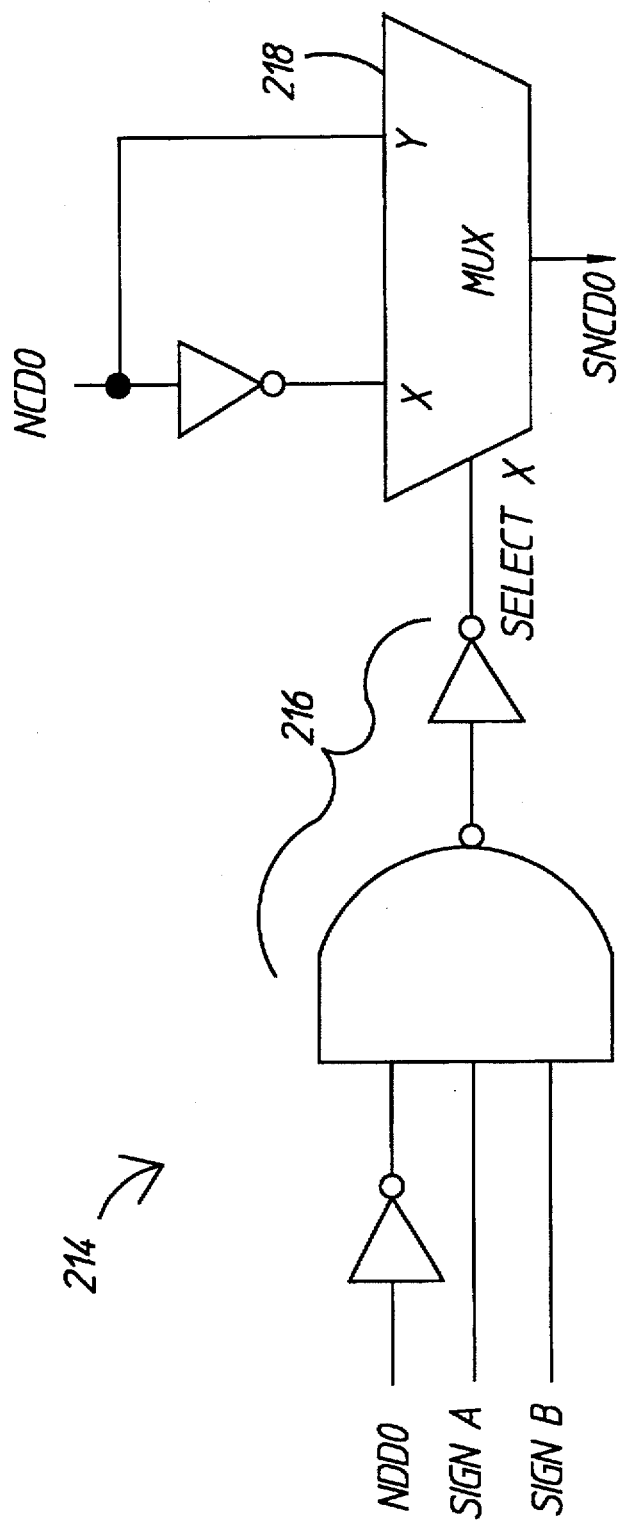
FIG. 6 is a block diagram of a comparator output adjust block for the floating point comparator of FIG. 5.

Referring also to FIG. 6, the comparator output adjustment circuit 214 includes an AND gate 216 that has a first input responsive to the sign bit (sign A) from the vertex coordinate register 202, a second input responsive to the sign bit (sign B) from the minimum clipping extent register 204, and a third input responsive to an inverted version of the first output NDD0 of the magnitude comparator 213. An output of the AND gate is operatively connected to a select input of a multiplexer 218, which has a first data input responsive to NCD0 and a second data input responsive to an inverted version of NCD0. The multiplexer has a data output SNCD0 that acts as an output of the comparator output circuit. An exclusive-NOR gate 215 has a first input operatively connected to the data output SNCD0 and a second input operatively connected to the first output NDD0 of the magnitude comparator 214. The output of the exclusive-NOR gate acts as the minimum output line 212 of the second comparator 208. The first comparator 206 is similar to the second comparator, except that it does not include an exclusive-NOR gate. Instead, the multiplexer data output SNCD0 is used as the maximum output 210.

Referring again to FIGS. 3 and 4, the maximum output line 210 from the first comparator and the minimum output line 212 from the second comparator are each operatively connected to a respective parallel input line of each of a series of vertex clip code shift registers 220, 244, 246, 248. The preprocessing circuit 112 can include two or more shift registers, with the number of shift registers corresponding to the number of vertices processed by the preprocessing circuit. In the present illustrative embodiment, four shift registers are provided, but only the first shift register 220 will be described in detail, as the second shift register 244, third shift register 246, and fourth shift register 248 can be structurally identical to it.

The first vertex clip code shift register 220 includes a shift register storage element 229 made up of a series of single-bit memory cells. There are six of them 232, 234, 236, 238, 240, 242 in the present embodiment, because this embodiment operates on a three-dimensional coordinate space. The circuit could also be configured to operate using other types of coordinate spaces, however, and would then employ a different number of memory cells.

The first vertex clip code shift register 220 also has a first vertex load control line 224, a first parallel input line 226 for the first cell 232, and a second parallel input line 228 for the second cell 234. The first parallel input 226 is operatively connected to the minimum output line 212 and the second parallel input line is operatively connected to the maximum output line 210. The vertex load control line 224 can be driven by the left stack control unit 122.

The memory cells 232, 234, 236, 238, 240, 242 are connected such that they can shift their contents by two elements and perform a two-bit parallel load at the same time. In particular, upon receipt of a load signal on the first load control line 224, the contents of the first memory cell 232 are shifted to the third memory cell 236, while the contents of the second memory cell 234 are shifted to the fourth memory cell 238. Similarly, the contents of the third memory cell are shifted to the fifth memory cell 240, while the contents of the fourth memory cell are shifted to the sixth memory cell 242. At the same time, the signal on the minimum output line 212 is parallel loaded into the first memory cell and the signal on the maximum output line 210 is parallel loaded into the second memory cell. The second shift register 244, the third shift register 246, and the fourth shift register 248 each operate independently in a similar manner under control of their respective separate vertex load control input lines 245, 247, 249.

The shift registers 220, 244, 246, 248 have parallel outputs operatively connected to different inputs of an accept/reject circuit 250. The accept/reject circuit asserts the trivial accept signal on the trivial accept line if all of the bits in all of the enabled shift registers are zero. It asserts the trivial reject signal on the trivial reject line if the same bit in all of the registers is set to one.

Figure 8:
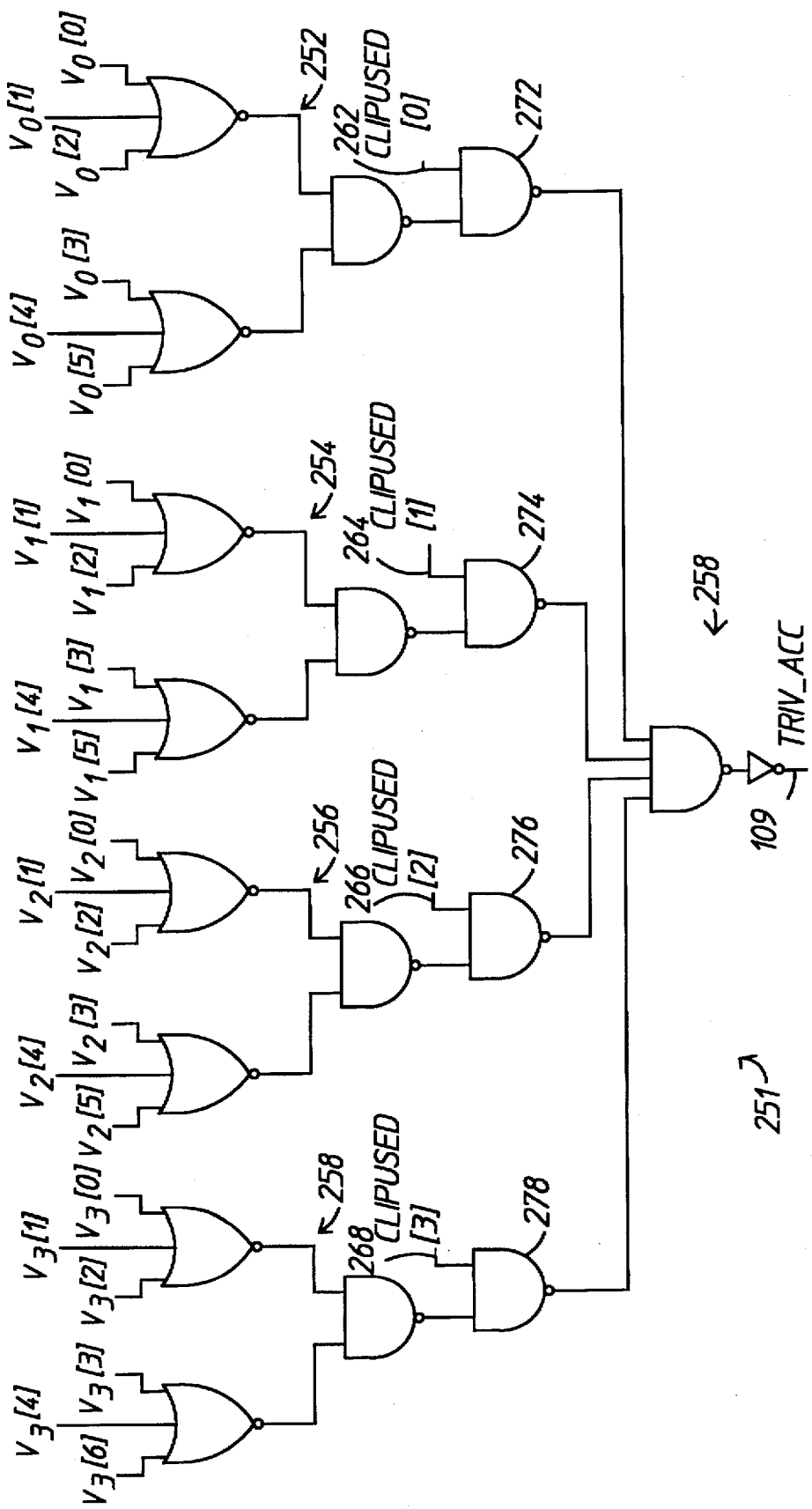
FIG. 8 is a logic diagram of a trivial accept circuit of the clipping preprocessing circuit of FIG. 4.

Referring to FIGS. 4 and 8, the accept/reject circuit 250 includes a trivial accept circuit 251. The trivial accept circuit comprises a first OR gate 252 having six input lines that are operatively connected to the six output lines from the parallel output of the first shift register 220. Similarly, second 254, third 256, and fourth 258 OR gates each have six input lines respectively operatively connected to the six output lines of the second 244, third 246, and fourth 248 shift registers. Output lines of the first, second, third and fourth OR gates are respectively operatively connected to first input lines of a first NAND gate 272, a second NAND gate 274, a third NAND gate 276, and a fourth NAND gate 278. These NAND gates each also have a second input line operatively connected respectively to a first vertex enable line 262, a second vertex enable line 264, a third vertex enable line 266 and a fourth vertex enable line 268. The four NAND gates have output lines operatively connected to one of four inputs of an output NAND gate 280. An output line of the NAND gate acts as the trivial accept output 109.

Figure 9:
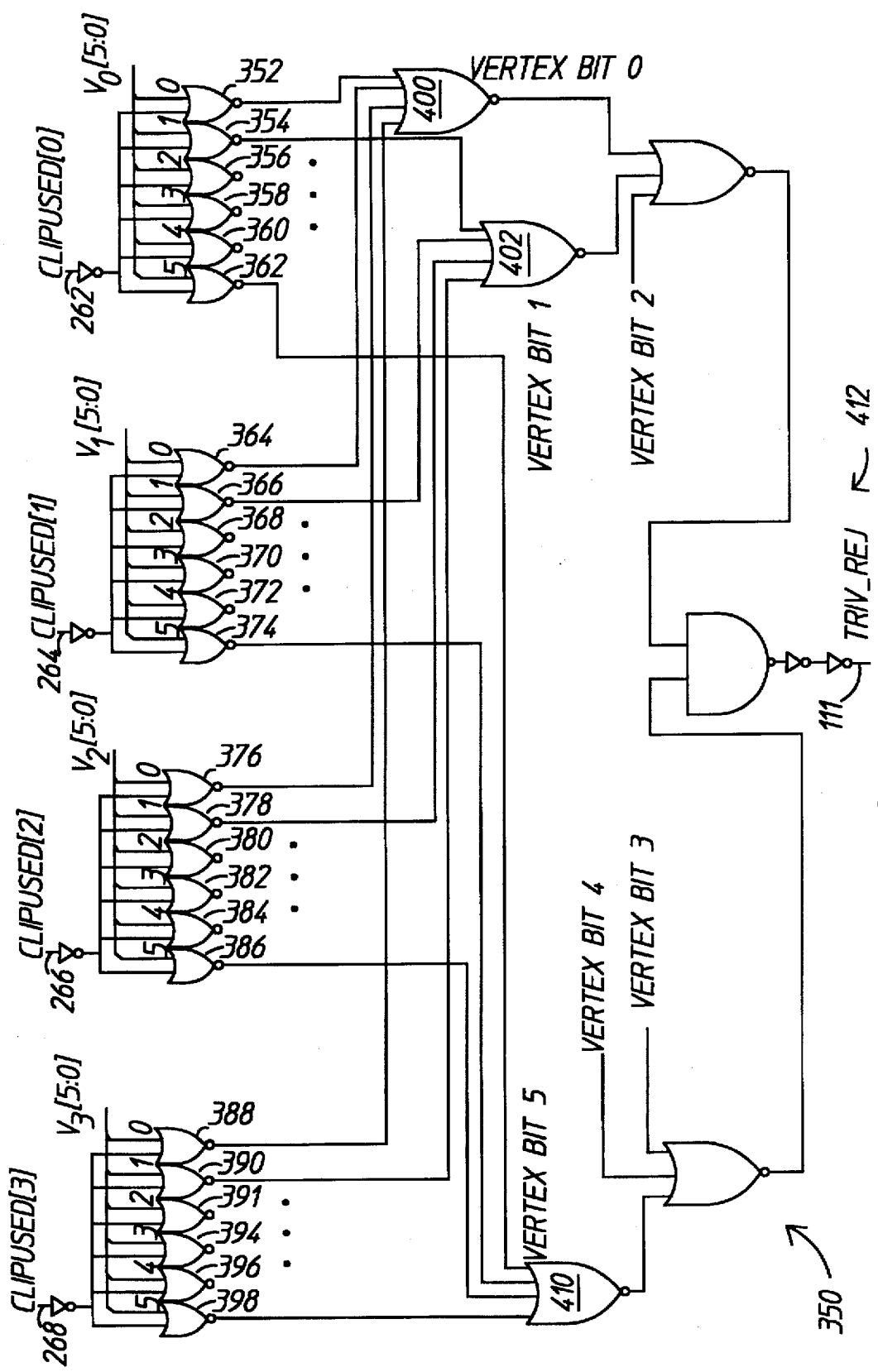
FIG. 9 is a logic diagram of a trivial reject circuit of the clipping preprocessing circuit of FIG.4.
Figure 10:
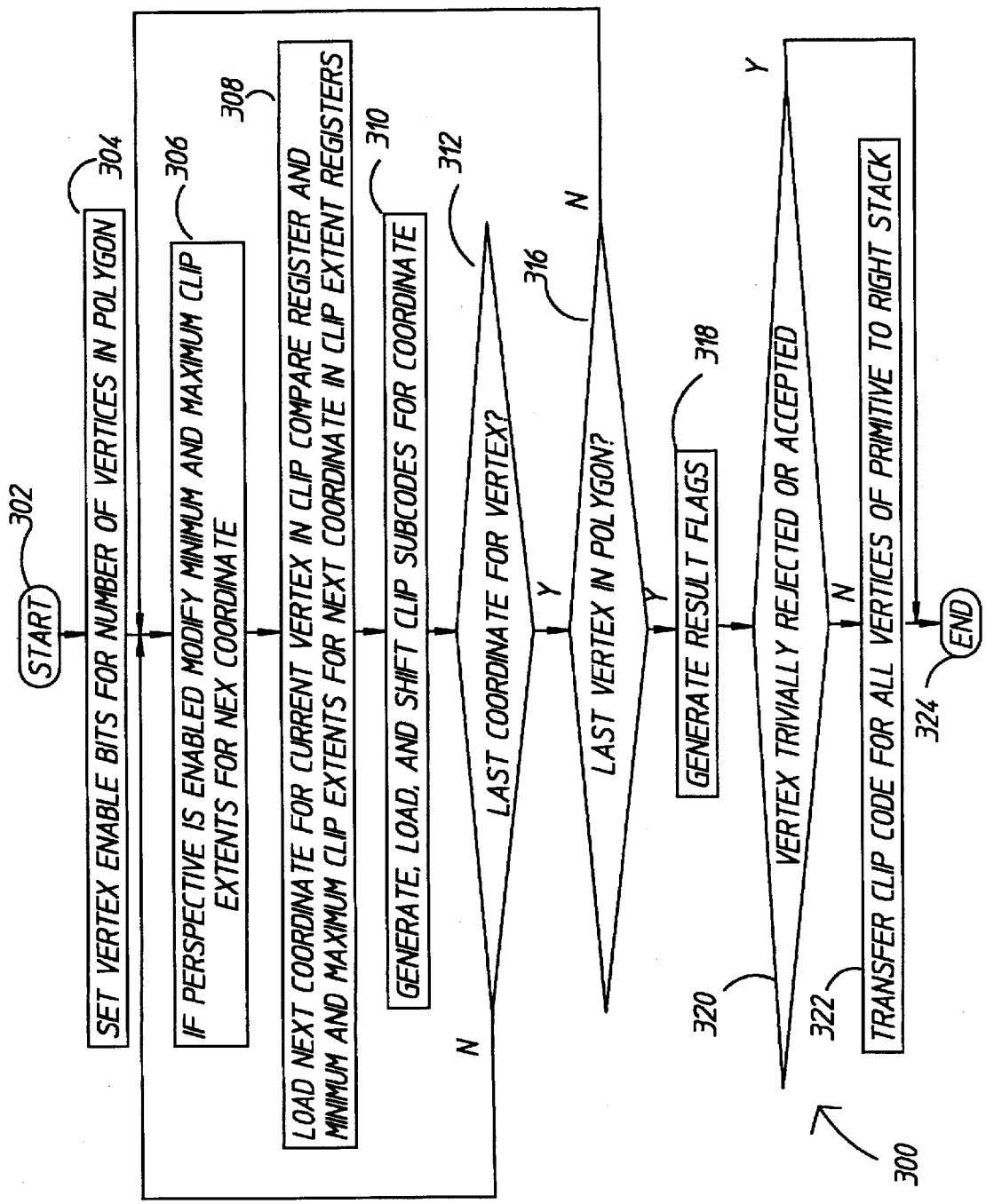
FIG. 10 is a flowchart illustrating the operation of the clipping preprocessing circuit of FIG. 4 for a single primitive.

Referring to FIGS. 4 and 9, the accept/reject circuit 250 also includes a trivial reject circuit 350. This circuit includes a first bank of NOR gates that comprises a first NOR gate 352, a second NOR gate 354, a third NOR gate 356, a fourth NOR gate 358, a fifth NOR gate 360, and a sixth NOR gate 362. These NOR gates each have a first input line operatively connected to one of the output lines of the first shift register 220. They each also have a second input line operatively connected to an inverted version of the first vertex enable line 262. In a like manner, a second bank of NOR gates, which includes a first NOR gate 364, a second NOR gate 366, a third NOR gate 368, a fourth NOR gate 370, a fifth NOR gate 372, and a sixth NOR gate 374, is operatively connected to the output of the second shift register 244 and an inverted version of the second vertex enable line 264. Further, a third bank of NOR gates 376, 378, 380, 382, 384, 386 is operatively connected to the output of the third shift register 246 and the third vertex enable line 266, and a fourth bank of NOR gates 388, 390, 392, 394, 396, 398 is operatively connected to the output lines of the fourth shift register 248 and an inverted version of the fourth vertex enable line 268.

An output line of the first NOR gate 352, 364, 376, 388 in each bank (i.e., the NOR gates that have an input line that is operatively connected to the output line of the first memory cell of its corresponding shift register) is operatively connected to one of the input lines of a first four-input NOR gate 400. Similarly, output lines of the second NOR gate 354, 366, 378, 390 of each bank are operatively connected to four inputs of a second four-input NOR gate 402. The third, fourth, and fifth NOR gates of each bank also have output lines that are respectively operatively connected to third, fourth, and fifth four-input NOR gates (not shown). The sixth NOR gate 362, 374, 386, 398 in each of the banks has an output line that is operatively connected to one input line of a sixth four-input NOR gate 410. The outputs of the first, second, third, fourth, fifth, and sixth four-input NOR gates are each operatively connected to one input of a six-input OR gate 412. The output of this six-input OR gate acts as the trivial reject output 111.

In operation, referring to FIGS. 3–10, the clipping preprocessing circuit 112 receives from the left stack 110 clipping extents and transformed coordinates for each vertex of a primitive to be clipped. The clipping extents include a minimum value and a maximum value for each coordinate of a primitive. For three-dimensional coordinates, for example, these extents include a minimum x value $x_{min}$, a maximum x value $x_{max}$, a minimum y value $y_{min}$, a maximum y value $y_{max}$, a minimum z value $z_{min}$, and a maximum z value $z_{max}$.

Clipping preprocessing 300 begins as transformation operations are being finished for the first vertex of a primitive in the left stack 110, making a transformed first coordinate (e.g., x) of the first vertex of a primitive available (step 302). While clipping preprocessing is underway, the left stack 110 finishes the transformation operations.

Also around the beginning of clipping preprocessing, the left stack control unit 122 provides enable signals on a number of the vertex enable lines 262, 264, 266, 268, which number is equal to the number of the vertices in the primitive (step 304). For a line segment, the first vertex enable signal and the second vertex enable signal are asserted. In the case of a triangle, the first vertex enable signal, the second vertex enable signal, and the third vertex enable signal are asserted. In the case of a quadrilateral, all four of the signals on the four vertex enable lines are asserted. Although in this embodiment point primitives are not supported, such a primitive could be accommodated by enabling a single enable signal. In the case of vectors, any combination of the signals on two of the four vertex enable lines can be asserted. Note that the circuitry can include an arbitrary number of vertex enable lines and associated circuitry, such that primitives having arbitrary numbers of vertices can be processed.

If perspective is enabled, the left stack next modifies the minimum and maximum clip extents for the first coordinate of the first vertex of the primitive by multiplying them by the perspective factor W for the transformed vertex using the floating point multiplier 120 (step 306). This modification is required when perspective mode is enabled because the view volume is then a truncated pyramid, which has the property that its sides do not have constant Cartesian coordinates. In perspective mode, therefore, minimum and maximum clip extents can be different for each vertex of a primitive.

After the optional modification step 306, the first coordinate (e.g., x) of the first vertex of the primitive is loaded into the clip compare register 202, the minimum clip extent for this first coordinate is loaded into the minimum clip extent register 204, and the maximum clip extent for this first coordinate is loaded into the maximum clip extent register 200 (step 308). The first and second floating point comparators 206, 208 compare these values, and the first comparator generates a maximum flag bit, while the second comparator generates a minimum flag bit. Once these values have settled, the left stack control unit 122 loads the minimum flag bit into the first cell 232 of the first shift register and the maximum flag bit into the second cell 234 of the first shift register 220 by asserting the signal on the first load line 224 (step 310). This pair of flag bits for a single coordinate of a vertex can be termed a "clip subcode." At the same time, the shift register shifts the rest of its contents by two cells.

Next, if there are remaining coordinates for the vertex ("no" branch of step 312), the step of modifying clip extents, (step 306), the step of loading coordinates in clip extents (step 308), and the step of generating, loading, and shifting clip subcodes (step 310) are repeated for the remaining coordinates in the first vertex. When all the clip subcodes for the first vertex have been generated and stored ("yes" branch of step 312), and there are remaining vertices in the primitive ("no" branch of step 316), the above-described steps are repeated to generate subcodes for each of the coordinates of the remaining vertex or vertices.

When subcodes have been generated and stored for all of the vertices in the primitive ("yes" branch of step 316), the accept/reject logic 250 generates the trivial accept and trivial reject signals respectively on the trivial accept line 109 and the trivial reject line 111 (step 318). If the primitive is not trivially rejected or accepted, the clip codes stored in the first shift register 220, the second shift register 244, the third shift register 246, and the fourth shift register 248 are transferred over the clip code bus 113 to the right stack 130 (step 322), and pre-processing of the primitive is complete (step 324). If the vertex is either trivially rejected or trivially accepted, the clip code is not transferred.

Figure 7:
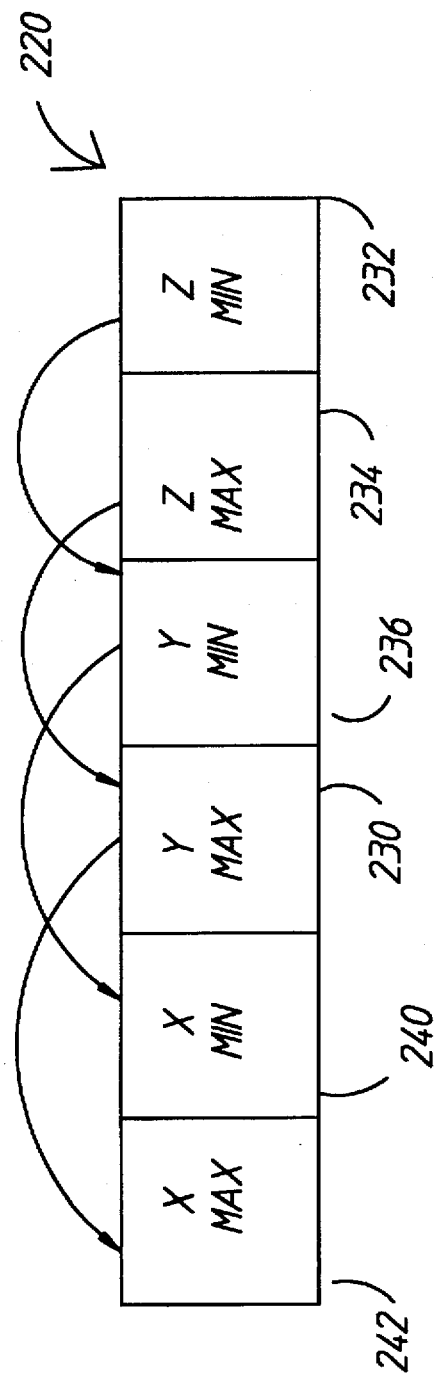
FIG. 7 is a data flow diagram illustrating the operation of the first shift register in the clipping preprocessing circuit of FIG. 4.

The transfer of data within the shift registers is illustrated in FIG. 7. In particular, the minimum x flag and the maximum x flag of a vertex are first stored respectively in the first memory cell 232 and the second memory cell 234. The flags are then respectively shifted by two into the third memory cell 236 and the fourth memory cell 238, while the y clip codes are inserted in the first and second memory cells. Next, the x clip codes are again transferred, this time respectively from the third and fourth memory cells to the fifth and sixth memory cells 240, 242, the y clip codes are respectively transferred from the first and second memory cells to the third and fourth memory cells, and the z clip codes are loaded into the first and second memory cells.

By shifting subcodes in this way, a clip code word including the clip subcodes for each of the coordinates is assembled in the shift register. It is noted that the clip subcodes for the coordinates could all be generated at the same time in one large combinatorial circuit, and a shift register would not be needed. This is not done in this implementation, since this circuit would require more integrated circuit area. In addition, since the vertex coordinates can be made available from the transformation computations by the left stack 110 in a sequential fashion as the transformation computations are being performed for remaining coordinates, the clipping preprocessor does not need to operate on the coordinates all at once.

The trivial reject line 111 is operatively connected to an input of the left stack control unit 122. If the trivial reject signal is asserted, the decomposition and partial slope calculations for the primitive are immediately stopped by the left stack control unit, such as by deasserting an enable input for the left stack. The assertion of this signal also prevents the left stack control unit from validating the data for the primitive that has been transferred from the left stack 110 to one of the primitive RAM buffers 132, 134, effectively preventing rejected primitive vertex data from being transferred to the right stack 130. This can save the left and right stacks from having to perform decomposition, partial slope calculations, clipping, lighting, and other computations on vertex data that will not be displayed at all. As a result, both stacks can operate more efficiently.

The trivial reject line 111 is also operatively connected to an input of the handshaking controller 107. The handshaking controller responds to this line by providing a trivial reject flag, which indicates the state of the trivial reject line, to the right stack control unit 152 via an internal register. The right stack control unit uses this flag when the primitive is the last one in a series or "chunk" of primitives, to determine whether to send an end-of-chunk indication to the concentrator even though no parameters are to be sent for that primitive. Sending this indication when the last primitive in a chunk is outside of the clipping region allows the concentrator to remain synchronized with the primitive data stream.

The clip code bus 113 is operatively connected directly to an input of the right stack control unit 152. The trivial accept line 109 is operatively connected to an input of the handshaking control unit 107. The handshaking control unit 107 responds to this line by providing a trivial accept flag, which indicates the state of the trivial accept line, to the right stack control unit 152 via an internal register. The trivial accept flag and the clip code are used by a clipping processor that is implemented as part of the right stack. This clipping processor uses the clipping/lighting RAM 154 for temporary storage, and can apply a known clipping method, such as the method described by I. E. Sutherland and G. W. Hodgman, in "Reentrant Polygon Clipping," CACM, 17(1), January 1974, 34–42.

The right stack control unit 152 responds to the asserted state of the trivial accept flag by refraining from enabling the clipping processor. It does this because the assertion of the trivial accept flag indicates that the primitive lies entirely within the clip volume, and therefore no clipping processing needs be performed on it. By refraining from enabling the clipping processor for preaccepted primitives, the right stack 130 is left free to perform other operations.

Figure 11:
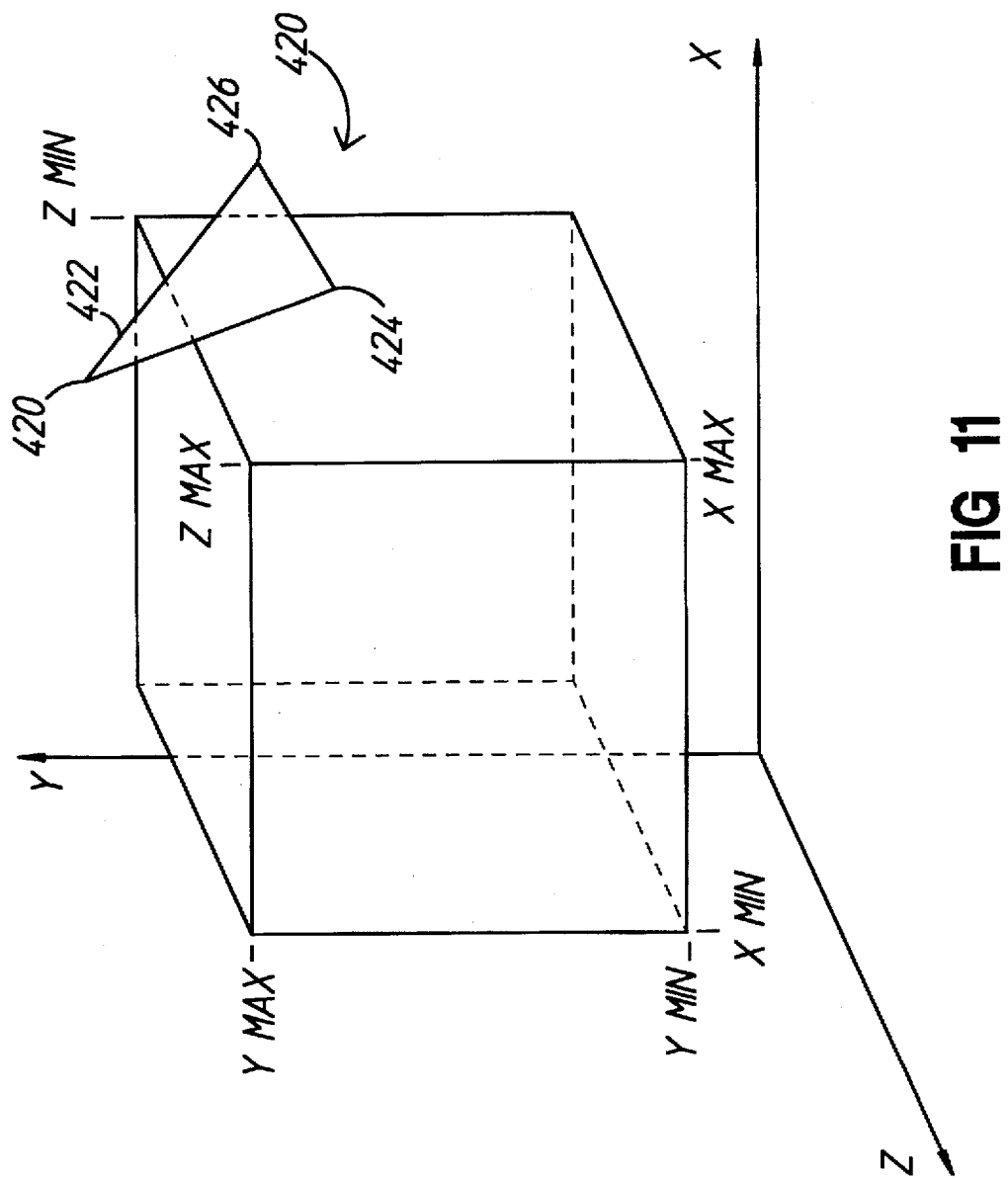
FIG. 11 is a diagram illustrating a clip region and a triangular primitive to be rendered by the geometry accelerator of FIG. 3.

When neither the trivial accept signal on the trivial accept line 109 or the trivial reject signal on the trivial reject line 111 are asserted, the clipping processor performs clipping operations on the primitive. Note that these may still result in the primitive not being displayed, since the clip code logic 112 does not trivially reject all rejectable primitives. The reason that the clip code logic 112 does not trivially reject all rejectable primitives may be more easily understood with reference to the 3-dimensional clip region 420 shown in FIG. 11. First, consider a primitive in which all vertices have x coordinates between the minimum x coordinate $x_{min}$ and the maximum x coordinate $x_{max}$, have y coordinates between the minimum y coordinate $y_{min}$ and the maximum y coordinate $y_{max}$, and have z coordinates between the minimum z coordinate $z_{min}$ and the maximum z coordinate $z_{max}$. Since all these vertices will fall within the clip region, the entire primitive must fall within the clip region. This corresponds to the trivial accept condition.

On the other hand, in the case of a trivial rejection, all of the vertices of the primitive must be found in one of six half spaces outside of the clip region. These half spaces include the space in which the x coordinate of the vertex is below $x_{min}$, the space in which the x coordinate is above $x_{max}$, the space in which the y coordinate is below $y_{min}$, the space in which the y coordinate is above $y_{max}$, the space in which the z coordinate is below $z_{min}$, and the space in which the z coordinate is above $z_{max}$. The primitive can have its vertices in more than one of these half spaces, however, and still be entirely outside the clipping region. For example, a triangular primitive 422 could have two vertices 424, 426 in the half space in which the x coordinate is above $x_{max}$ and vertex 428 that is not in that volume, but is inserted in the half space in which the y coordinate is above $y_{max}$. The clipping preprocessor 112 will not eliminate primitives such as this one, and both stacks 110, 130 will perform more processing on it before the clipping processor in the right stack 130 determines that it need not be displayed. On balance, however, in many cases the clipping preprocessing will still speed up processing significantly, resulting in an overall improvement in performance. IN addition, because the clipping preprocessor generates clipcodes, the clipping processor will not need to recalculate them when clipping is performed. The clip codes can assist the clipping processor in determining which vertices need to be clipped.

The above circuit can also be made to handle polylines and triangle strips. A polyline is a primitive that is made up of a succession of end-to-end line segments defined by a series of vertices. Each time a vertex of a polyline is received, a new segment is defined in the polyline, and the clipping preprocessor can then be operated to determine if this segment can be trivially accepted or rejected. This operation is performed by alternating between two of the shift registers each time coordinates for a new vertex is received. One of the shift registers receives the clip codes for the new vertex, the other is left alone with the clip codes from the last vertex, and trivial accept and reject signals for the newly-defined segment can then be generated from these clip codes.

A triangle strip is a primitive that is made up of a succession of adjacent triangles defined by a series of vertices. After a first triangle is defined in a triangle strip, each time another vertex is received, it defines a new triangle along with the last two vertices received. These vertices are handled in much the same way as those for polylines, except that the clip code preprocessor alternates through three shift registers, instead of two.

The circuitry shown and described herein is given by way of example only. The circuitry is preferably implemented in a large scale custom integrated circuit designed both directly at the gate level and using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET"s which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

While there have been shown and described what are at present considered the preferred embodiments of the present invention, it will be obvious to those skilled in the art that various changes and modifications may be made therein without departing from the scope of the invention as defined by the appended claims.

We claim:

1. A graphics processing circuit for use in a graphics accelerator that includes a clipping processor having a vertex data input and a control input and being constructed and arranged to clip a primitive relative to a clip region based on primitive vertex data from its vertex data input and under control of its control input, comprising:

a vertex input data path operatively connected to the vertex data input of the clipping processor, a clipping preprocessor circuit having a vertex data input operatively connected to the vertex input data path and a control output operatively connected to the control input of the clipping processor, the clipping preprocessor being constructed and arranged to perform an evaluation of a relationship between the primitive vertex data from the vertex input data path and the clip region and to provide a signal on the control output based on this evaluation, and wherein the clipping preprocessor includes at least three vertex processing circuits each including clip code circuitry and wherein the clipping preprocessor includes trivial accept/reject circuitry having an input responsive to the clip code circuitry for each of the vertex processing circuits.

2. The apparatus of claim 1 wherein each vertex processing circuit has an enable input and is constructed and arranged to generate clip codes for the primitive based on the primitive vertex data from its vertex data input, the graphics processing circuit further comprising:

a comparator between the vertex input data path and the vertex data input of the vertex processing circuitry.

3. The apparatus of claim 1 wherein each of the vertex processing circuits in the clipping preprocessor includes x coordinate preprocessing circuitry, y coordinate preprocessing circuitry, and z coordinate preprocessing circuitry.

4. The apparatus of claim 3 wherein the x coordinate preprocessing circuitry, the y coordinate preprocessing circuitry, and the z coordinate preprocessing circuitry each include memory cells in a shift register and wherein the trivial accept/reject circuitry has combinatorial logic circuitry operatively connected to outputs of the memory cells.

5. The apparatus of claim 1 wherein the clipping preprocessor circuit includes:

a vertex coordinate register operatively connected to the vertex input data path, a window edge coordinate register operatively connected to the vertex input data path, a comparator having a first input operatively connected to an output of the vertex coordinate register, a second input operatively connected to an output of the window edge coordinate register, and having a comparison output, and wherein the vertex processing circuits include a plurality of inputs operatively connected to the comparison output.

6. The apparatus of claim 5 wherein the comparator is a floating point comparator.

7. The apparatus of claim 5 wherein the vertex processing circuits each include a shift register having a parallel input operatively connected to the comparison output.

8. The apparatus of claim 1 further including a clip code bus operatively connected between the clipping preprocessor and the clipping processor.

9. The apparatus of claim 1 wherein the vertex processing circuits each have an enable line.

10. A graphics processing method, comprising:

generating clip codes from a definition of a first primitive having at least three vertices, the clip codes including subcodes for each coordinate of each of the vertices, after the step of generating, determining whether the coordinates of the primitive are all outside the boundary of the clip region based on the clip codes, allowing a clipping processor to clip the primitive in response to a result of the step of determining if the step of determining determines that some but not all of the coordinates of the primitive are outside of the boundary of the clip region, and inhibiting the clipping processor from clipping the primitive in response to a result of the step of determining if the step of determining determines that the coordinates of the primitive are all outside the boundary of the clip region.

11. The method of claim 10 wherein the step of generating is performed by a first graphics processor portion and further including the step of inhibiting the transfer of display parameters of the primitive to a second graphics processor portion in response to the result of the step of determining if the step of determining determines that the coordinates of the primitive are all outside the boundary of the clip region.

12. The method of claim 10 further including the steps of generating further clip codes from a definition of a second primitive that is different from the first primitive and that has only coordinates outside of the boundary of the clip region, and based on the further clip codes failing to determine that the coordinates of the second primitive are all outside the boundary of the clip region.

13. The method of claim 10 further including the steps of generating further clip codes from a definition of a second primitive that is different from the first primitive and that has only coordinates inside the boundary of the clip region, and determining based on the further clip codes that the coordinates of the second primitive are all inside the boundary of the clip region.

14. The method of claim 10 wherein the step of generating is performed by a first graphics processor portion and further including the step of transferring the clip codes for the primitive to a second graphics processor portion.

15. The method of claim 10 further including the step of generating clip codes from a definition of a second primitive that has a different number of vertices than the first primitive.

16. The apparatus of claim 1 wherein the trivial accept/reject logic is purely combinatorial.

17. The method of claim 10 wherein the step of determining is performed entirely by combinatorial logic circuitry.

18. The method of claim 15 wherein the step of generating a clip code from a definition of a second primitive generates a clip code for a primitive that has four vertices.

* * * * *